United States Patent
Cote et al.

(10) Patent No.: US 6,439,562 B1
(45) Date of Patent: Aug. 27, 2002

(54) PRE-CYLINDER SIGNATURE COLLECTOR

(75) Inventors: Kevin Lauren Cote, Durham; Michael Lee Hearn, Dover, both of NH (US); John Lee Ketchum, Old Orchard, ME (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/277,789

(22) Filed: Mar. 29, 1999

(51) Int. Cl.[7] ............................................. B65H 39/00
(52) U.S. Cl. ............................. 270/52.17; 270/58.01; 270/52.14; 271/303
(58) Field of Search ................................ 271/182, 301, 271/303, 304; 270/52.09, 52.14, 52.17, 10, 19, 58.01, 52.07

(56) References Cited

U.S. PATENT DOCUMENTS

| | | | |
|---|---|---|---|
| 3,815,897 A | * | 6/1974 | Hoehl et al. ................. 271/303 |
| 4,345,671 A | | 8/1982 | Tosato et al. |
| 4,720,091 A | | 1/1988 | Kobler |
| 4,721,294 A | | 1/1988 | Petersen |
| 4,746,107 A | | 5/1988 | Schneider et al. |
| 4,919,027 A | * | 4/1990 | Littleton ...................... 271/182 |
| 4,925,173 A | * | 5/1990 | Lindblom et al. ......... 271/52.14 |
| 4,944,503 A | * | 7/1990 | Arima ....................... 270/52.09 |
| 5,083,769 A | * | 1/1992 | Young .......................... 271/303 |
| 5,098,075 A | * | 3/1992 | Lindblom ................. 370/52.14 |
| 5,143,368 A | * | 9/1992 | Kiyota et al. ............... 271/182 |
| 5,417,416 A | * | 5/1995 | Marmin ....................... 271/182 |
| 5,953,971 A | * | 9/1999 | Jacques .................... 270/52.09 |
| 6,332,606 B1 | * | 12/2001 | Seki ........................... 271/303 |

FOREIGN PATENT DOCUMENTS

| | | |
|---|---|---|
| DE | 662478 C | 7/1938 |
| DE | 721 761 | 6/1942 |
| DE | 35 27 710 A1 | 2/1987 |
| EP | 0 169 489 A1 | 1/1986 |
| EP | 0 210 633 | 2/1987 |

* cited by examiner

*Primary Examiner*—H. Grant Skaggs
(74) *Attorney, Agent, or Firm*—Laurence A. Greenberg; Werner H. Stemer; Gregory L. Mayback

(57) ABSTRACT

A web press has cutting cylinders for cutting a web into signatures and a transfer cylinder for receiving the signatures. A pre-cylinder signature collector includes a diverter station for diverting the signatures received from the cutting cylinders. At least two tape paths having different lengths receive the signatures from the diverter station. At least one collection point collects the signatures from all of the tape paths on top of one another for passage to the transfer cylinder.

7 Claims, 6 Drawing Sheets

PRE-CYLINDER SIGNATURE COLLECTOR

BACKGROUND OF THE INVENTION

Field of the Invention

The invention relates to a pre-cylinder signature collector in a web press having cutting cylinders for cutting a web into signatures and a transfer cylinder for receiving the signatures.

A web press can print multiple images around the circumference of an impression cylinder. If signatures containing the images are cut from the web and collected together in a folding process, then a collect cylinder is required. The collect cylinder grips a cut signature and transports it completely around the cylinder so that it can be combined with a signature from a different part of the impression cylinder. That process continues until the total number of signatures are collected, and then the collected signatures are transferred from the collect cylinder to the next stage of the process, usually a jaw cylinder.

The problem with that approach is that the size of the collect cylinder s dictated by the number of signatures that will be collected. If the impression cylinder is printing two signatures around, then the collect cylinder cannot be made of an even number of gripper parts. If the impression cylinder is printing three signatures around then the collect cylinder can not be 3, 6, 9, or any multiple of three gripper parts around. That coupling between the desired number of collected signatures and the number of parts on the collect cylinder forces the collect cylinder to be very large and expensive in order to accommodate different collected signatures from the same cylinder.

Another problem with the current approach is that the signatures must remain single-spaced on the collect cylinder so that a gripper can grip the leading edge of all of the signatures that will be collected to form an output. That requirement does not allow the signatures to slow down as they are being transported by the collect cylinder because the signatures would become imbricated.

U.S. Pat. No. 4,746,107 and German Published, Non-Prosecuted Patent Application DE 35 27 710 A1 are cited as showing devices which are representative of such prior art devices.

SUMMARY OF THE INVENTION

It is accordingly an object of the invention to provide a pre-cylinder signature collector, which overcomes the hereinafore-mentioned disadvantages of the heretofore-known devices of this general type and which collects the signatures before they arrive at the transfer cylinder.

With the foregoing and other objects in view there is provided, in accordance with the invention, in a web press having cutting cylinders for cutting a web into signatures and a transfer cylinder for receiving the signatures, a pre-cylinder signature collector, comprising a diverter station for diverting the signatures received from the cutting cylinders; at least two tape paths having different lengths for receiving the signatures from said diverter station; and at least one collection point for collecting the signatures from all of said tape paths on top of one another for passage to the transfer cylinder.

There are multiple paths from the cutting cylinder to the transfer cylinder. The length of these paths and the number of paths are determined by the desired number of signatures to be collected to form the output.

If the impression cylinder is two signatures around then there would be two different paths from the cutting cylinder to the collect cylinder, path "A" and path "B". If the length of path "A" is X then the length of path "B" would be (X plus P) or (X plus some multiple of P) where P is the pitch of the signatures as they leave the cutting cylinder. In this case, the first signature would be diverted to follow the long path and the next signature would follow the short path. The signatures would come together, one on top of the other as path "A" and path "B" converge before the transfer cylinder.

With this solution, the transportation and processing velocity of the signature can be reduced. The space between the signatures after they have been diverted into separate paths is large. This large space allows the signatures to be decelerated to a lower velocity. In the simple case of two paths, for example, the velocity of the signatures can be reduced to half of the velocity of the signatures at the exit of the cutting cylinder. The transfer cylinder can then rotate at one half the angular velocity that it would have had to rotate at otherwise. This significant reduction in velocity will improve the performance of the signature processing functions like fold-off.

In accordance with another feature of the invention, at least one of said tape paths has a spring-loaded tape roller for tensioning said tape path. In this way, the proper tape tension is maintained during changes which are made in the path length.

In accordance with a further feature of the invention, there is provided a tape roller contacting one of said tape paths, a pivot arm pivoting said tape roller about a pivot point, and an actuator pivoting said tape roller for changing the length of said tape path. The change in path length is accomplished in this way.

In accordance with an added feature of the invention, the at least two tape paths are three tape paths carrying first and second and third respective signatures, and said at least one collection point is two collection points, one of said collection points collecting the first and second signatures on top of one another and the other of said collection points collecting the first, second and third signatures on top of one another. This feature of the invention allows three signatures from the impression cylinder to be placed on top of one another.

FIG. 6 is a diagrammatic, side-elevational view of a pre-cylinder signature collector with a transport cylinder.

In accordance with an additional feature of the invention, at least one of said tape paths has a slowdown device for slowing down signatures on said tape path. The reduction in velocity improves the performance of signature processing functions such as fold-off.

In accordance with a concomitant feature of the invention, the at least two tape paths are three tape paths carrying first, second and third respective signatures, and said diverter station includes first and second diverters, said first diverter diverting the first and second signatures onto one of said tape paths and the third signature onto another of said tape paths, and said second diverter diverting the first and second signatures onto different tape paths. In this case, the sheets are diverted twice.

Other features which are considered as characteristic for the invention are set forth in the appended claims.

Although the invention is illustrated and described herein as embodied in a pre-cylinder signature collector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
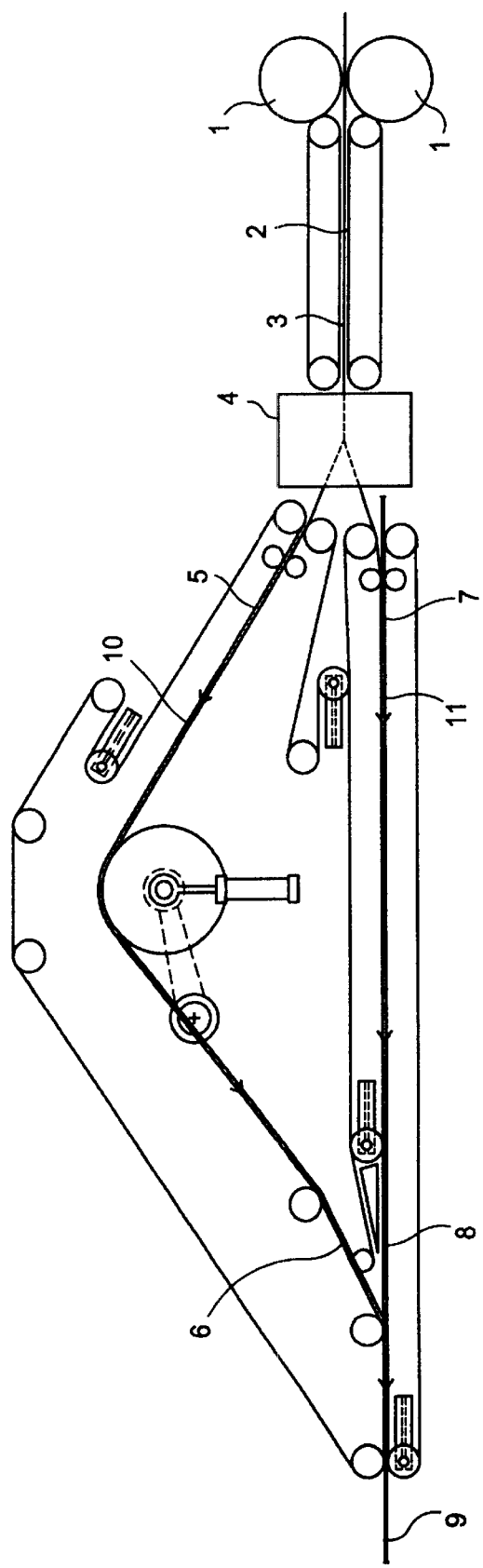
FIG. 1 is a diagrammatic, side-elevational view of a first embodiment of a pre-cylinder signature collector according to the invention, having two tape paths.
Figure 6:
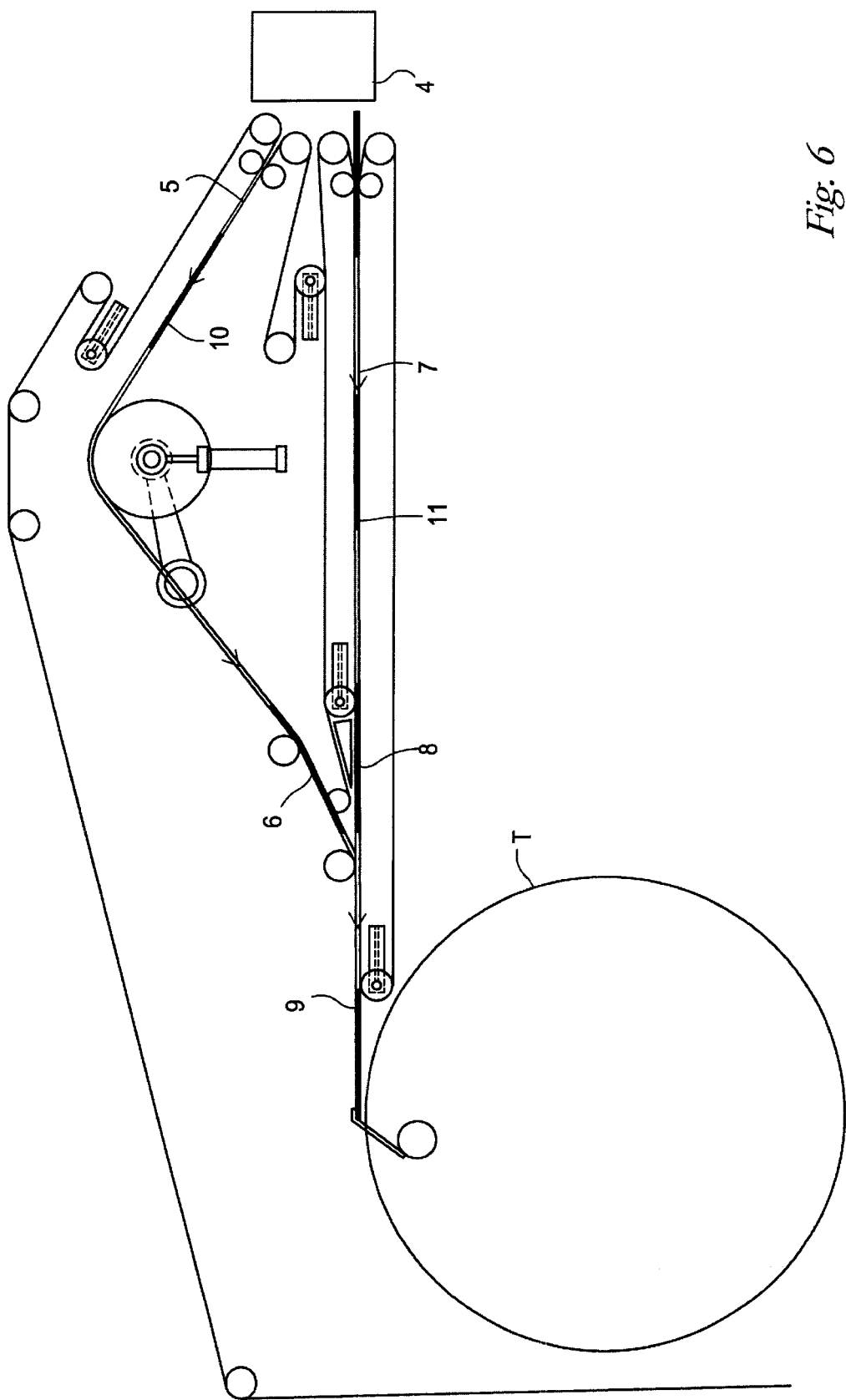
FIG. 6 is a diagrammatic, side-elevational view of a precylinder signature collector with a transport cylinder.

Referring now to the figures of the drawings in detail and first, particularly, to FIGS. 1 and 6 thereof, there are seen signatures 2 and 3 which exit cutting cylinders 1 and are transported along transport belts to a diverting station 4. A signature 10 is shown downstream of the diverting station 4 in a tape path 5 and a signature 7 is shown downstream of the diverting station 4 in a tape path 11. The tape path 5 is longer than tape path 11, so that when a signature 6 exits the tape path 5, it is aligned with a signature 8 as it exits the tape path 11. The two signatures indicated at reference numeral 9 are transported to a transfer cylinder T one on top of the other.

Figure 2:
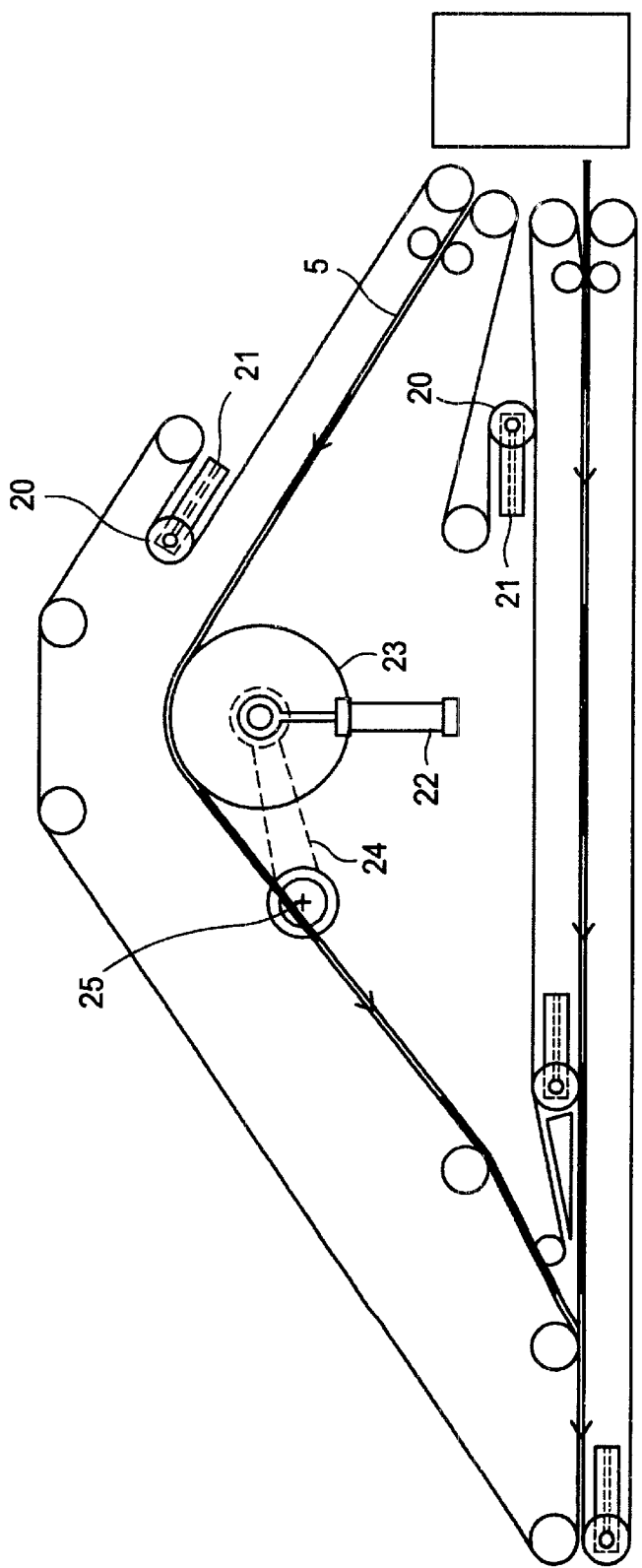
FIG. 2 is an enlarged view of the pre-cylinder signature collector according to FIG. 1.

FIG. 2 is an enlarged view of the two tape paths that are shown in FIG. 1. The length of the tape path 5 can be configured to accommodate variable length signatures or to phase the signatures in one tape path relative to signatures in another tape path. The change in path length is accomplished by controlling an actuator 22. The actuator pushes or pulls on a pivot arm 24 causing it to rotate about a pivot point 25. A tape roller 23 is moved as a result of the actuator motion to cause the path that the signature must follow to change. Tape rollers 20 are loaded by springs 21 so that the proper tape tension is maintained during path length changes.

Figure 3:
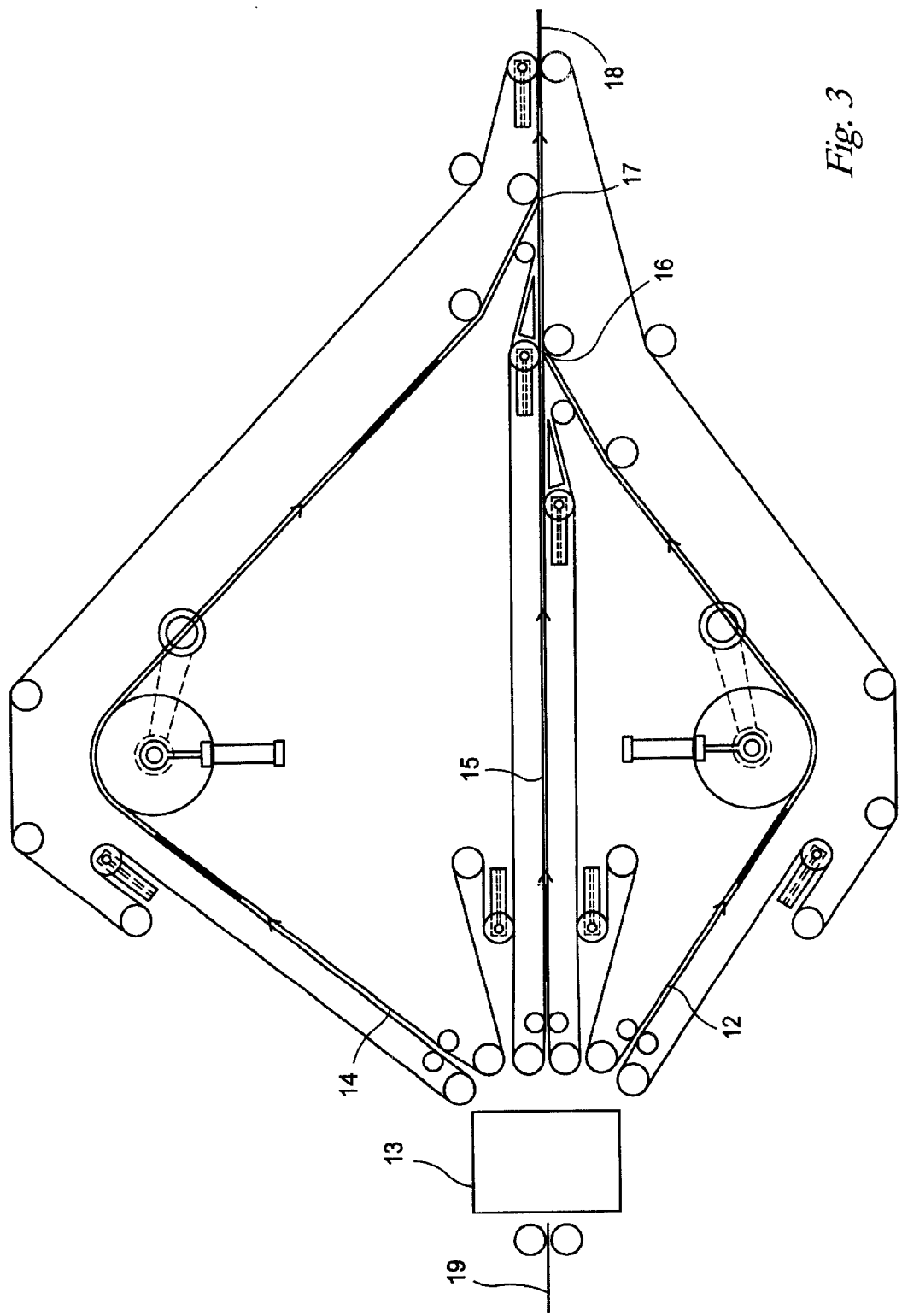
FIG. 3 is a side-elevational view of a second embodiment of a pre-cylinder signature collector having three tape paths.

FIG. 3 shows an embodiment in which there are three paths from the cutting cylinders to the transfer cylinder (not shown). In this case, a diverter station 13 has the ability to divert incoming signatures 19 into one of three possible paths 12, 14, or 15. The first signature is diverted to the longest path 14, the second signature is diverted to the mid-length path 12, and the third signature is diverted to the shortest path 15. The path lengths are configured in such a way that the second signature and the third signature arrive at a common point 16 at the same time and then travel together to meet the first signature at another common point 17. The three signatures 18 are transported in a collected configuration to the transfer cylinder (not shown).

Figure 4:
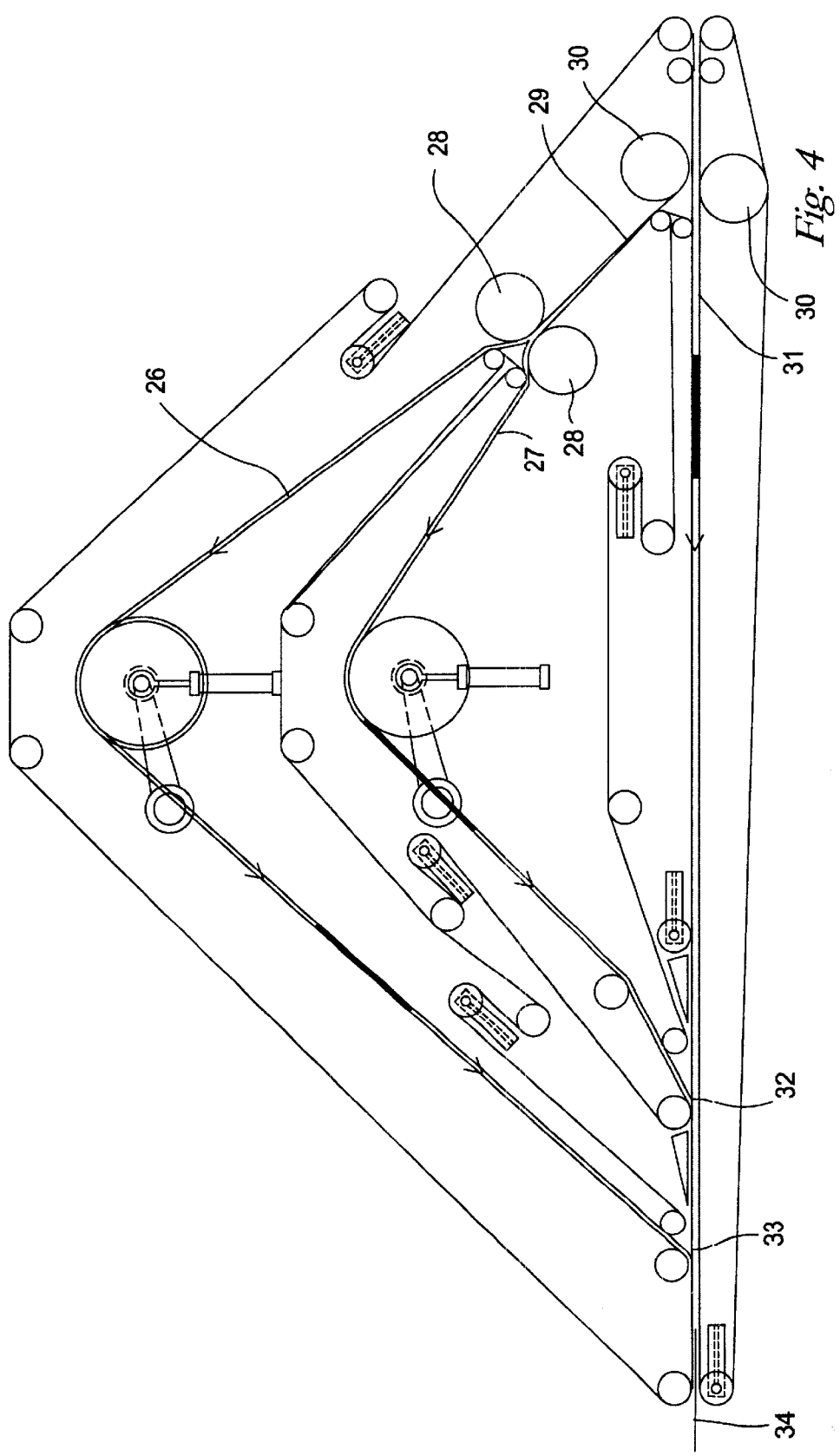
FIG. 4 is a side-elevational view of a third embodiment of a pre-cylinder signature collector having three tape paths and two diverters.

FIG. 4 shows another embodiment. In this embodiment the signatures are diverted to follow three different paths.

The first and second signatures are diverted by a first diverter 30 to a path 29 and the third signature is diverted to a path 31. The first and second signatures are diverted again by a second diverter 28. The first signature is diverted to a path 26 and the second signature is diverted to a path 27. The second and third signatures are collected at a point 32 and the first signature is collected with the previously collected second and third signatures at a point 33. The three signatures 34 leave in a collected configuration.

Figure 5:
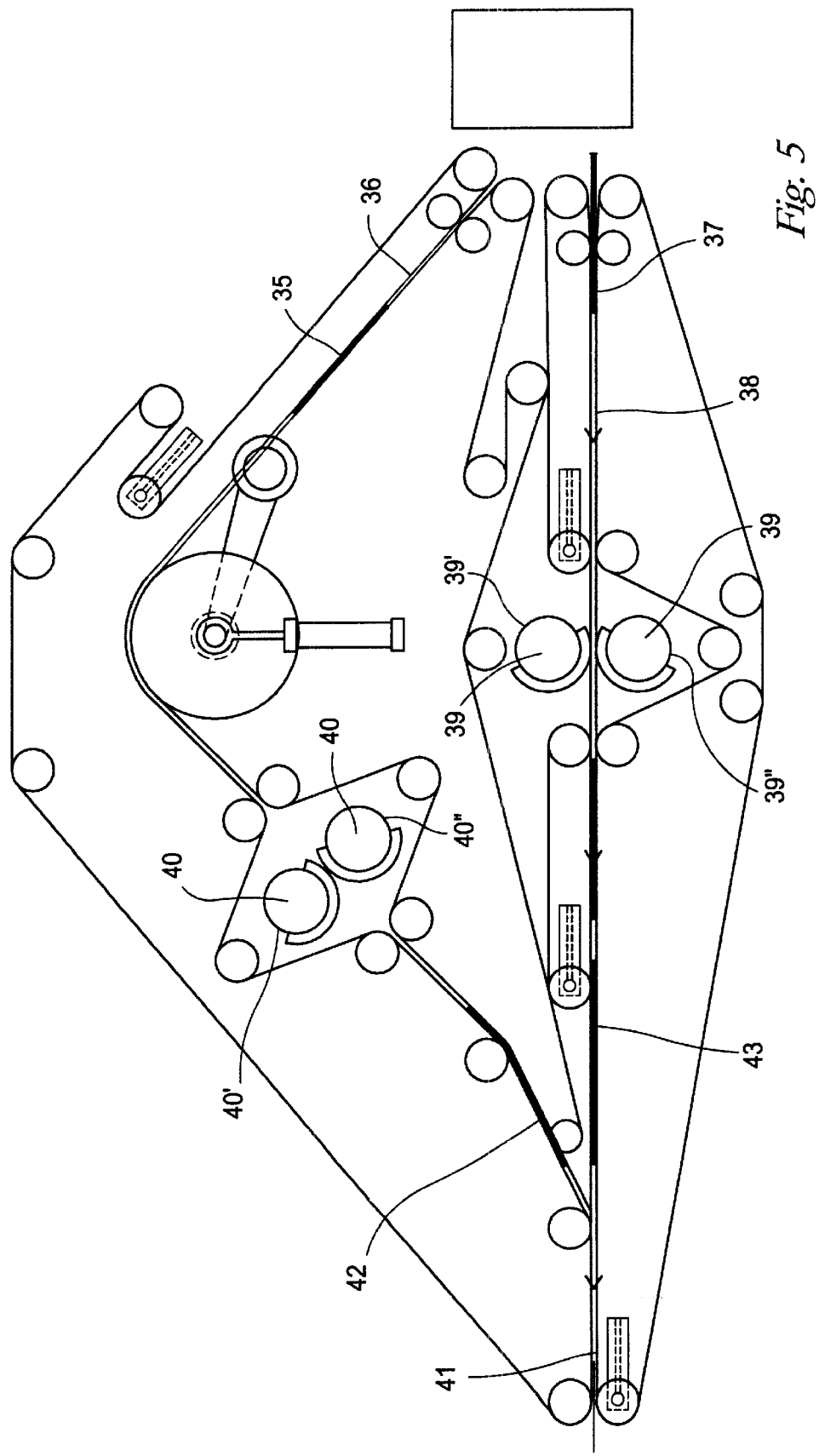
FIG. 5 is a side-elevational view of a pre-cylinder signature collector having a slowdown device.

FIG. 5 illustrates the concept of reducing the velocity of the signatures after they have been diverted. A slowdown device 39 reduces the velocity of the signatures in a path 38 so that a signature 43 is travelling at a lower velocity than a signature 37. Similarly, a slowdown device 40 reduces the velocity of signatures in a path 36 so that a signature 42 is travelling at a lower velocity than a signature 35. After the signatures in both paths have been decelerated, they are collected at a point 41 and transported to the transfer cylinder (not shown) at the reduced velocity.

We claim:

1. In a web press having cutting cylinders for cutting a web into signatures and a transfer cylinder for receiving the signatures, a pre-cylinder signature collector, comprising:

a diverter station for diverting the signatures received from the cutting cylinders;

at least two tape paths having different lengths for receiving the signatures from said diverter station; and at least one collection point downstream from said diverter station for collecting the signatures from all of said tape paths on top of one another for collectively transporting to the transfer cylinder.

2. The pre-cylinder signature collector according to claim 1, wherein at least one of said tape paths has a spring-loaded tape roller for tensioning said tape path.

3. The pre-cylinder signature collector according to claim 1, including a tape roller contacting one of said tape paths, a pivot arm pivoting said tape roller about a pivot point, and an actuator pivoting said tape roller and changing said length of said one of said tape paths.

4. The pre-cylinder signature collector according to claim 1, wherein said at least two tape paths are three tape paths carrying first and second and third respective signatures, and said at least one collection point is two collection points, one of said collection points collecting the first and second signatures on top of one another and the other of said collection points collecting the first, second and third signatures on top of one another.

5. The pre-cylinder signature collector according to claim 1, wherein at least one of said tape paths has a slowdown device for slowing down signatures on said tape path.

6. The pre-cylinder signature collector according to claim 1, wherein said at least two tape paths are three tape paths carrying first, second and third respective signatures, and said diverter station includes first and second diverters, said first diverter diverting the first and second signatures onto one of said tape paths and the third signature onto another of said tape paths, and said second diverter diverting the first and second signatures onto different tape paths.

7. The pre-cylinder signature collector according to claim 5, wherein said slowdown device includes a pair of cylinders sandwiching at least one of said tape paths.

* * * * *